(12) United States Patent
Meneses

(10) Patent No.: US 12,330,193 B2
(45) Date of Patent: Jun. 17, 2025

(54) POWER WASHING ASSEMBLY

(71) Applicant: Tiago Meneses, Tulare, CA (US)

(72) Inventor: Tiago Meneses, Tulare, CA (US)

( * ) Notice: Subject to any disclaimer, the term of this patent is extended or adjusted under 35 U.S.C. 154(b) by 603 days.

(21) Appl. No.: 17/720,950

(22) Filed: Apr. 14, 2022

(65) Prior Publication Data

US 2023/0330711 A1    Oct. 19, 2023

(51) Int. Cl.
| | | |
|---|---|---|
| *B05B 1/20* | (2006.01) | |
| *B05B 13/00* | (2006.01) | |
| *B08B 3/02* | (2006.01) | |

(52) U.S. Cl.
CPC ............... *B08B 3/024* (2013.01); *B05B 1/20* (2013.01); *B05B 13/005* (2013.01)

(58) Field of Classification Search
CPC ......... B08B 3/024; B08B 3/026; B08B 3/028; B05B 1/20; B05B 13/005; B05B 15/63; B05B 1/202; B05B 1/205; B05B 9/007; B05B 15/62; B60B 19/12; B60B 37/10
USPC ....................................................... 239/754
See application file for complete search history.

(56) References Cited

U.S. PATENT DOCUMENTS

| | | |
|---|---|---|
| 2,692,163 A | 10/1954 | Geel |
| 3,110,055 A | 11/1963 | Merrill |
| 3,931,931 A | 1/1976 | Otis |
| 4,095,746 A | 6/1978 | Anderberg |
| D250,826 S | 1/1979 | Newman |
| 4,930,706 A * | 6/1990 | Merlin ................... B05B 15/658 239/600 |
| 5,265,805 A * | 11/1993 | Artenian ............. A47L 11/4058 239/176 |
| 5,706,548 A * | 1/1998 | Schabacker ............. B08B 3/024 15/345 |
| 5,707,014 A | 1/1998 | Chan |
| 5,853,258 A * | 12/1998 | Woodruff .............. B05C 17/023 401/27 |
| 6,131,831 A * | 10/2000 | Lawrence ............... B60S 3/044 239/722 |
| 6,247,658 B1 * | 6/2001 | Bakas ..................... B60S 3/042 239/722 |
| 6,651,909 B1 * | 11/2003 | Bugarin .................. B08B 3/026 239/436 |
| 6,935,579 B1 * | 8/2005 | Lindsey .................. B08B 3/026 239/530 |

(Continued)

FOREIGN PATENT DOCUMENTS

| | | | |
|---|---|---|---|
| AU | 2016200008 A1 * | 8/2016 | |
| WO | WO2007146447 | 12/2007 | |

*Primary Examiner* — Qingzhang Zhou
*Assistant Examiner* — Anna Thi Ho

(57) ABSTRACT

A power washing assembly includes a spray bar that has a fluid inlet and a plurality of spray nozzles. The fluid inlet is fluidly attachable to a fluid source to direct a fluid from the fluid source into the spray bar. Each of the spray nozzles is in fluid communication with the fluid inlet to spray the fluid. A handle is coupled to the spray bar thereby facilitating the spray bar to be steered along the support surface to clean the support surface. A leg is coupled to and angles downwardly from the handle and a roller is rotatably coupled to the leg to roll along the support surface. A hook is coupled to the handle and the hook curves upwardly from the handle thereby facilitating the hook to hold a fluid hose that is fluidly coupled to the fluid source.

4 Claims, 10 Drawing Sheets

(56) References Cited

U.S. PATENT DOCUMENTS

| | | | |
|---|---|---|---|
| 7,063,281 B2* | 6/2006 | Schommer | B05B 7/0884 |
| | | | 239/428.5 |
| 7,080,953 B2 | 7/2006 | DeLaine, Jr. | |
| 9,107,555 B2* | 8/2015 | Slinkard | B05B 1/202 |
| 9,586,239 B2* | 3/2017 | Butler | B62B 1/00 |
| 9,770,730 B2* | 9/2017 | Stednitz | B05B 15/625 |
| 10,239,501 B2* | 3/2019 | Hisch | B60S 3/044 |
| 10,960,417 B1* | 3/2021 | Guglielmo | B08B 3/028 |
| 11,007,544 B2* | 5/2021 | Waring | B60S 3/044 |
| 11,273,800 B2* | 3/2022 | Bell | B05B 1/20 |
| 2004/0089749 A1* | 5/2004 | Bugarin | B05B 1/16 |
| | | | 239/569 |
| 2007/0169796 A1* | 7/2007 | Johnson | B08B 3/026 |
| | | | 134/123 |
| 2014/0137895 A1* | 5/2014 | Bruders | B08B 3/024 |
| | | | 134/21 |
| 2014/0263759 A1* | 9/2014 | Schwartau | E04C 2/296 |
| | | | 239/557 |
| 2021/0114045 A1* | 4/2021 | Bell | B05B 1/02 |

\* cited by examiner

POWER WASHING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to washing devices and more particularly pertains to a new washing device for generating a high pressure stream of water from a household water source to clean a support surface. The device includes a spray bar with a plurality of spray nozzles, a pair of wheels disposed on the spray bar for rolling along a support surface and a handle extending upwardly from the spray bar. The device includes a leg that angles downwardly from the handle and a roller that is pivotally disposed on the leg.

(2) Description of Related Art Including Information Disclosed Under 37 CFR 1.97 and 1.98

The prior art relates to washing devices including a variety of spray bar devices that includes a pair of rollers, a plurality of spray nozzles and a handle extending upwardly from the spray bar. The prior art discloses a scrubbing device that includes a brush with rollers for rolling along a support surface, a spray bar for spraying water, a handle attached to the spray bar and a fluid inlet. The prior art discloses an undercarriage cleaner which includes a spray bar with spray nozzles extending upwardly from the spray bar, a pair of wheels disposed on the spray bar and a handle pivotally coupled to the spray bar which includes a horizontal section, a vertical section and a roller disposed on a junction between the horizontal section and the vertical section.

BRIEF SUMMARY OF THE INVENTION

An embodiment of the disclosure meets the needs presented above by generally comprising a spray bar that has a fluid inlet and a plurality of spray nozzles. The fluid inlet is fluidly attachable to a fluid source to direct a fluid from the fluid source into the spray bar. Each of the spray nozzles is in fluid communication with the fluid inlet to spray the fluid. A handle is coupled to the spray bar thereby facilitating the spray bar to be steered along the support surface to clean the support surface. A leg is coupled to and angles downwardly from the handle and a roller is rotatably coupled to the leg to roll along the support surface. A hook is coupled to the handle and the hook curves upwardly from the handle thereby facilitating the hook to hold a fluid hose that is fluidly coupled to the fluid source.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
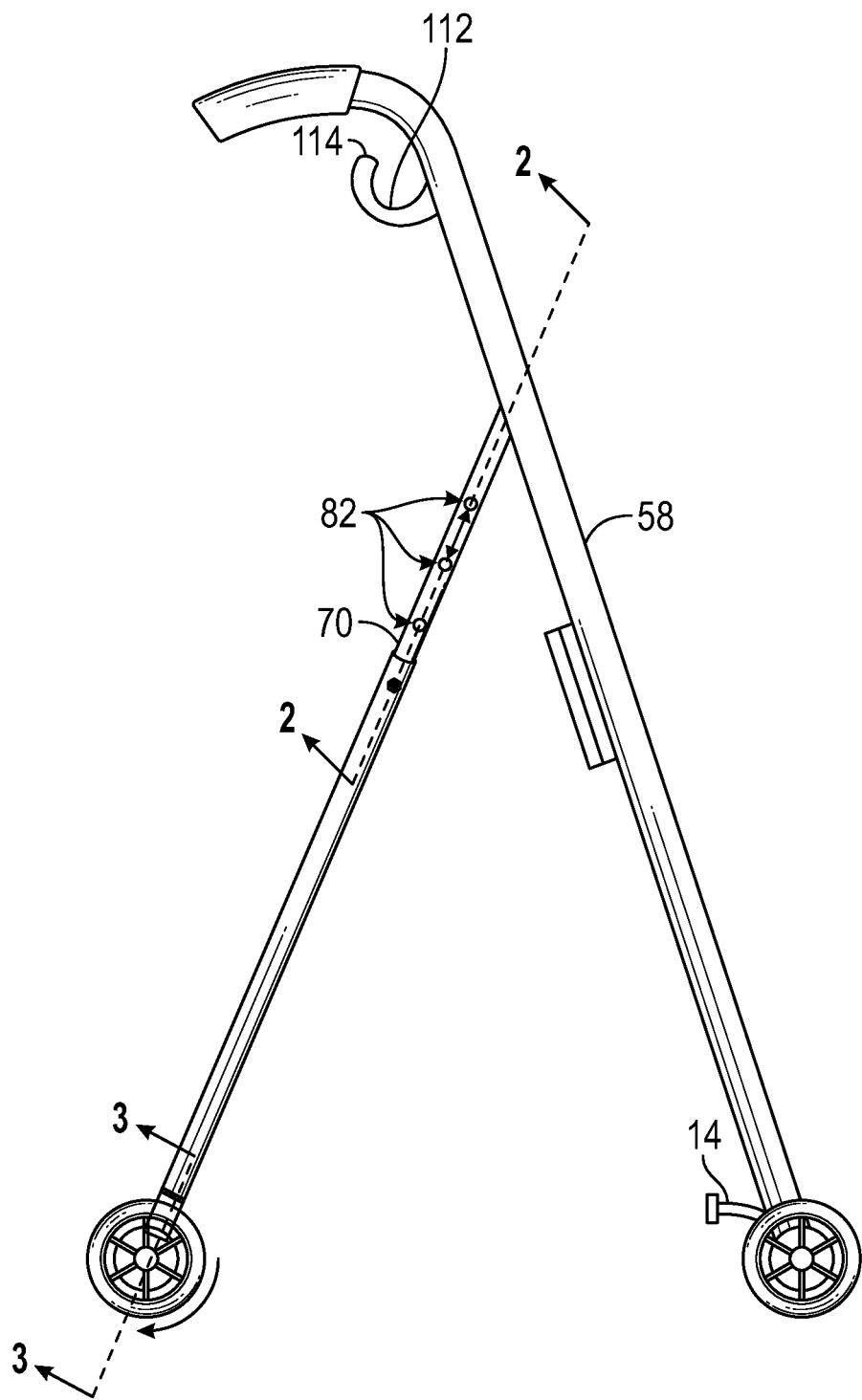
FIG. 1 is a right side view of a power washing assembly according to an embodiment of the disclosure.
Figure 2:
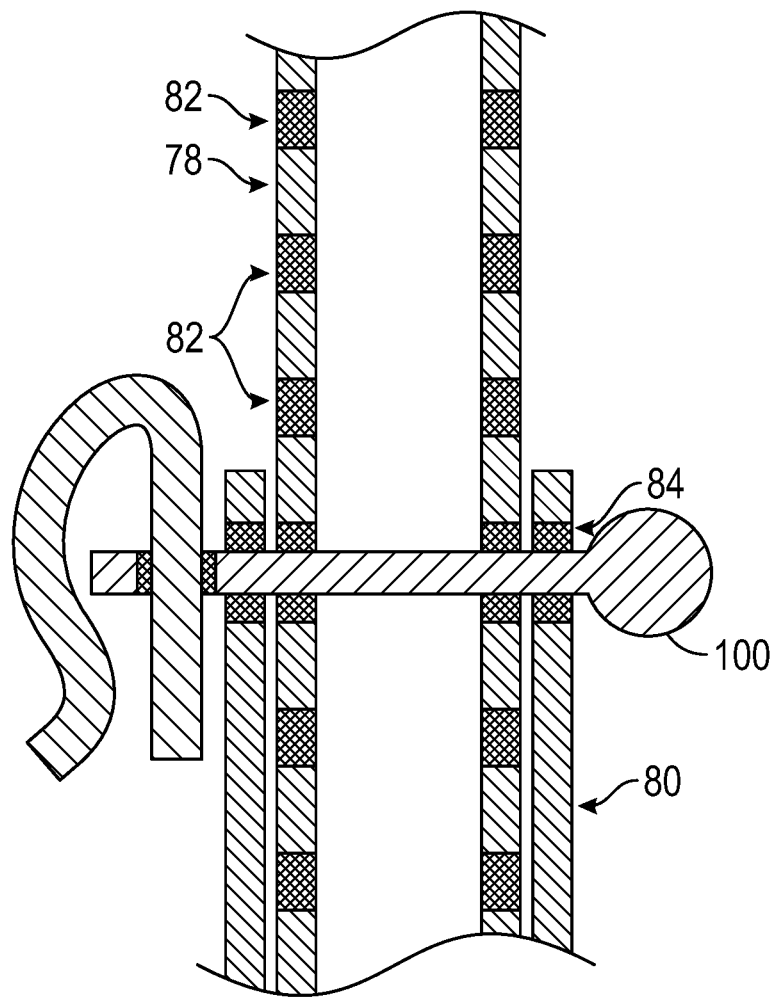
FIG. 2 is a cross sectional view taken along line 2-5 of FIG. 1 of an embodiment of the disclosure.
Figure 3:
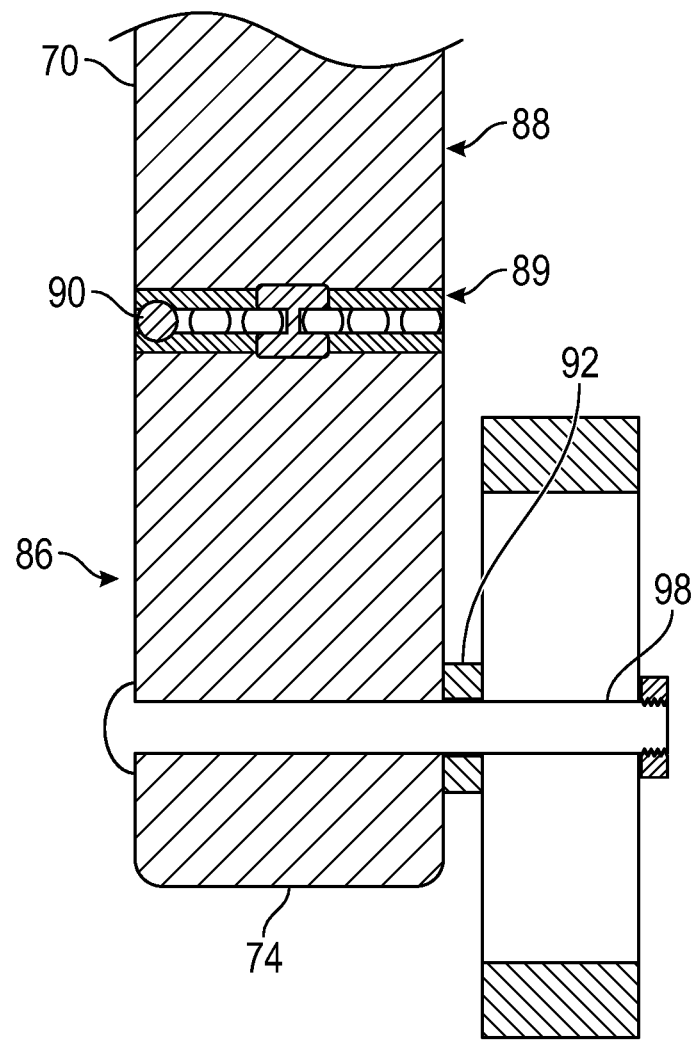
FIG. 3 is a cross sectional view taken along line 3-3 of FIG. 1 of an embodiment of the disclosure.
Figure 4:
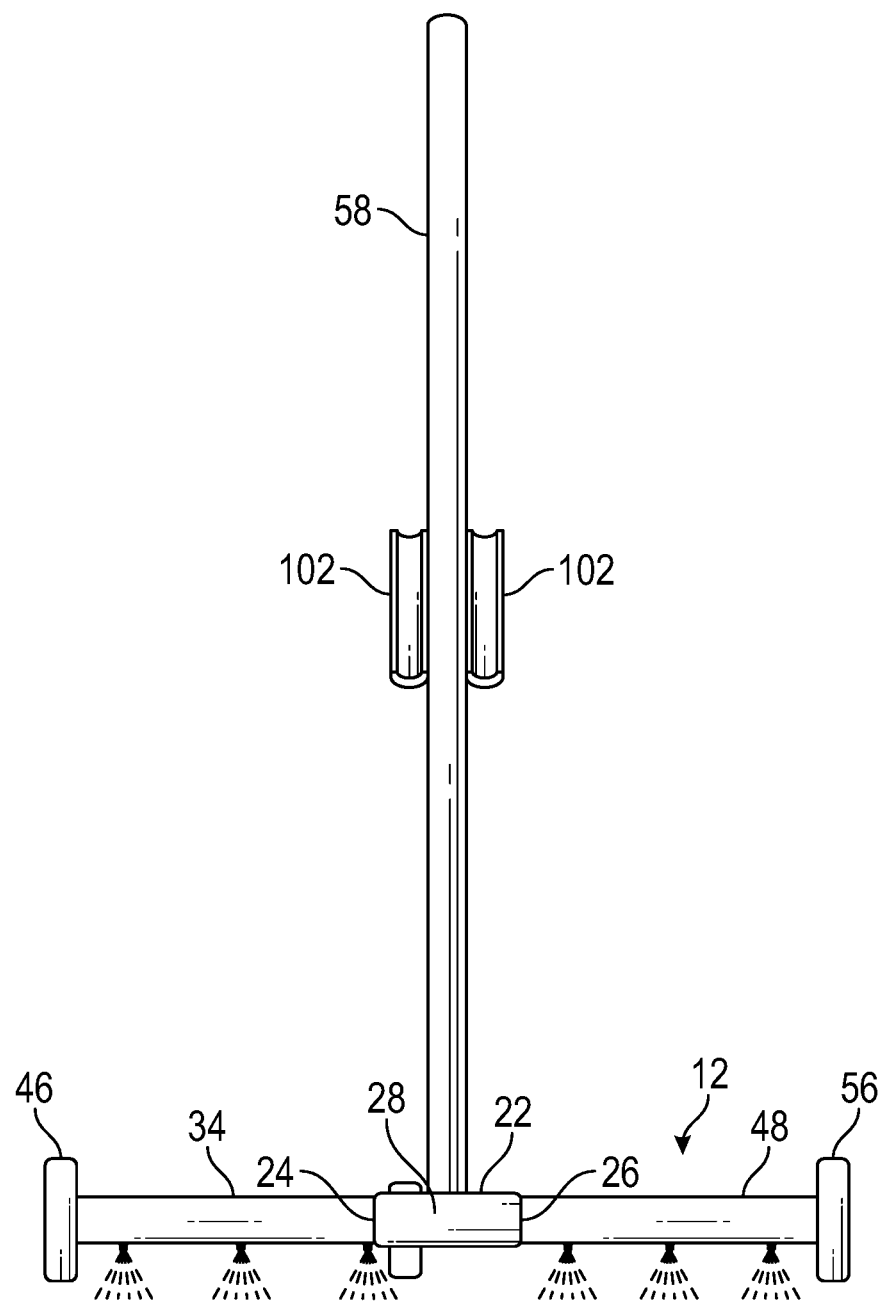
FIG. 4 is a front view of an embodiment of the disclosure.
Figure 5:
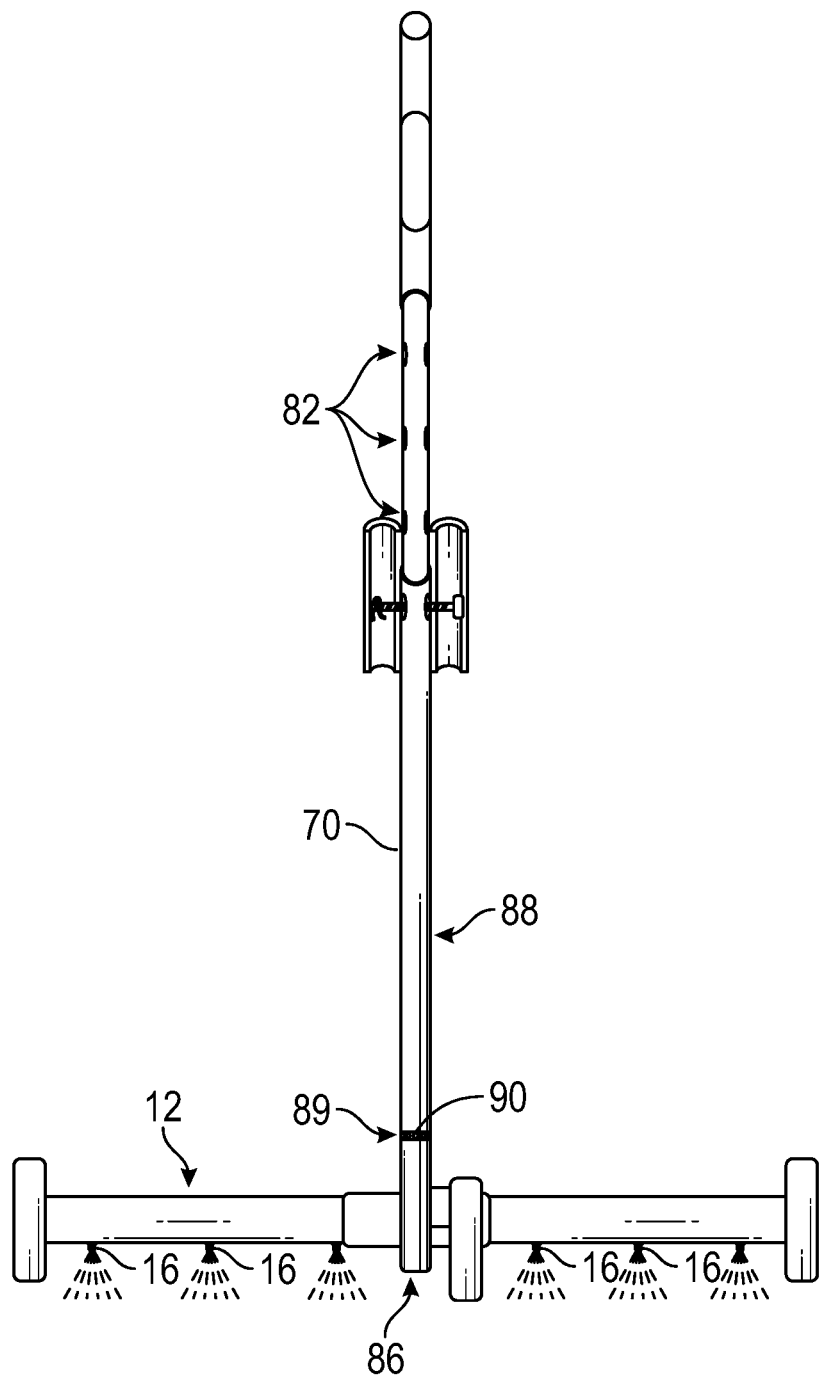
FIG. 5 is a back view of an embodiment of the disclosure.
Figure 6:
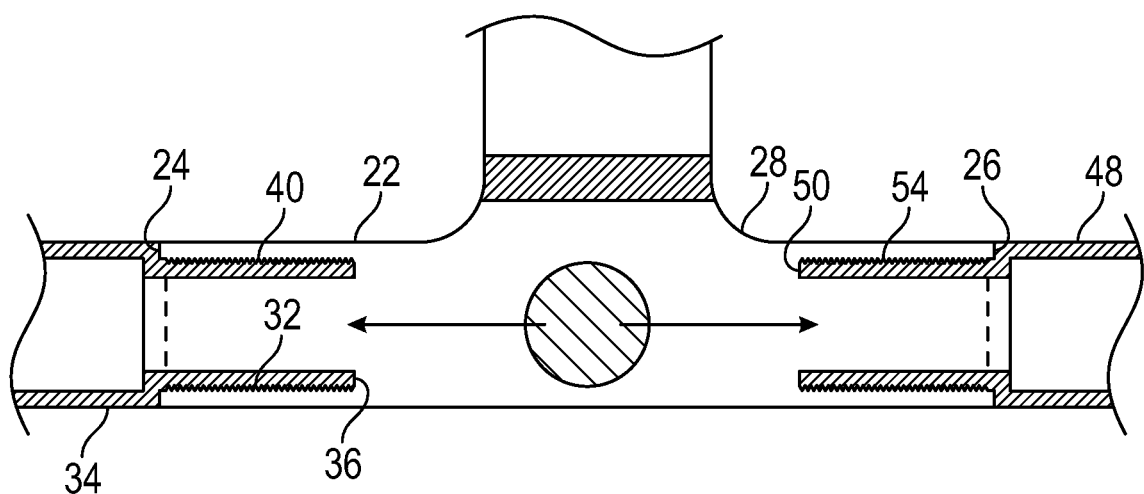
FIG. 6 is a cross sectional view taken along line 6-6 of FIG. 7 of an embodiment of the disclosure.
Figure 7:
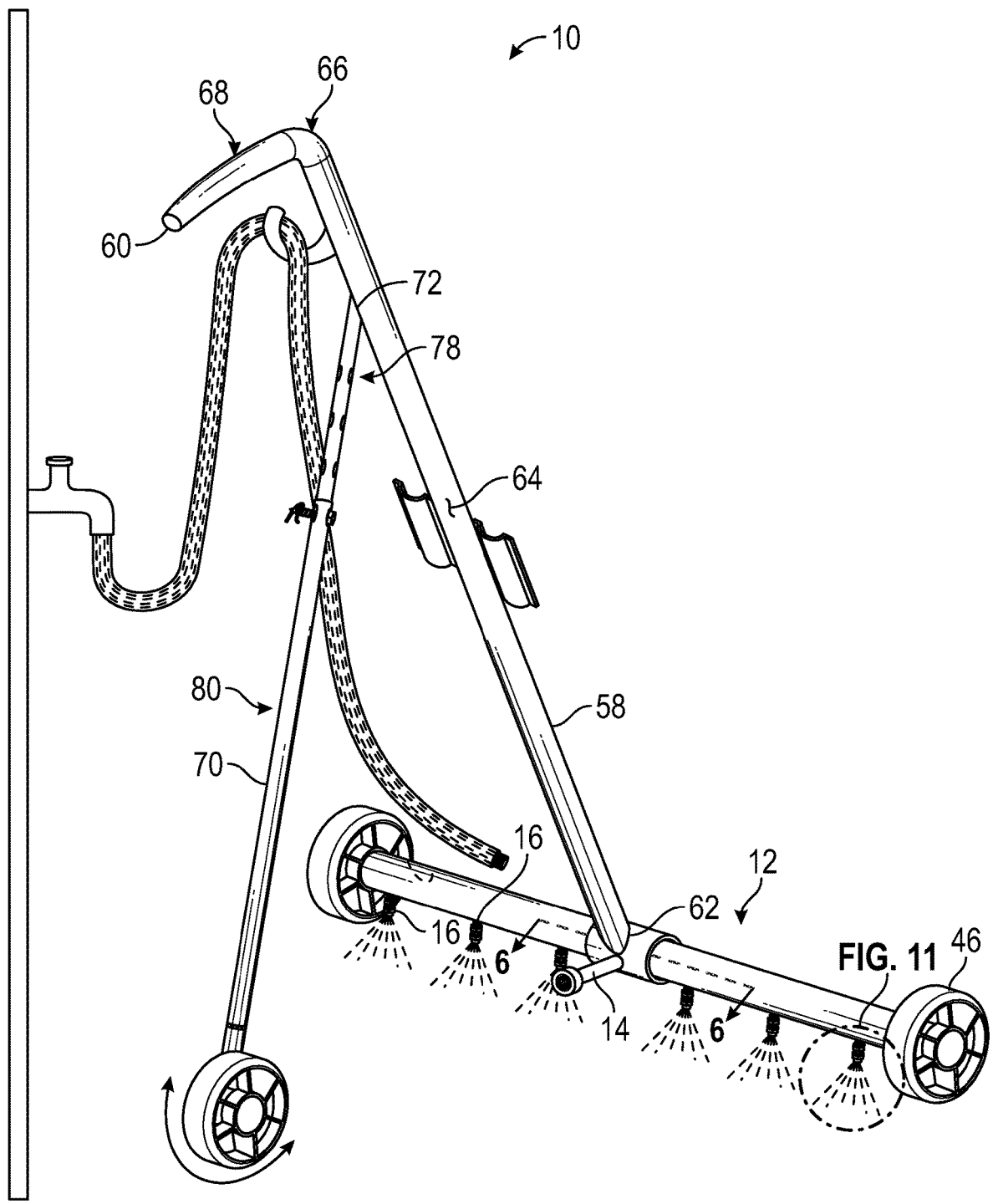
FIG. 7 is a back perspective view of an embodiment of the disclosure.
Figure 8:
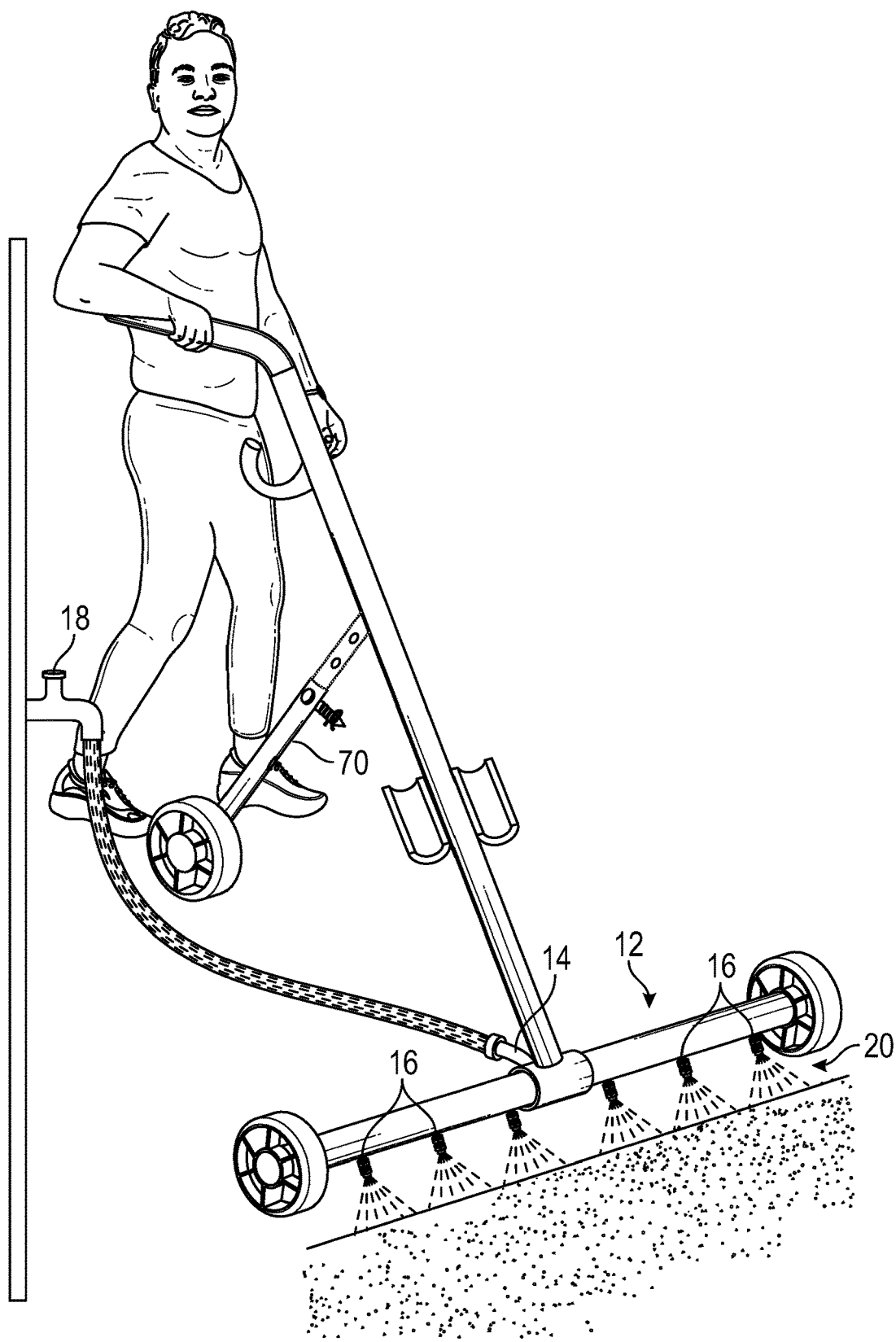
FIG. 8 is a perspective in-use view of an embodiment of the disclosure.
Figure 9:
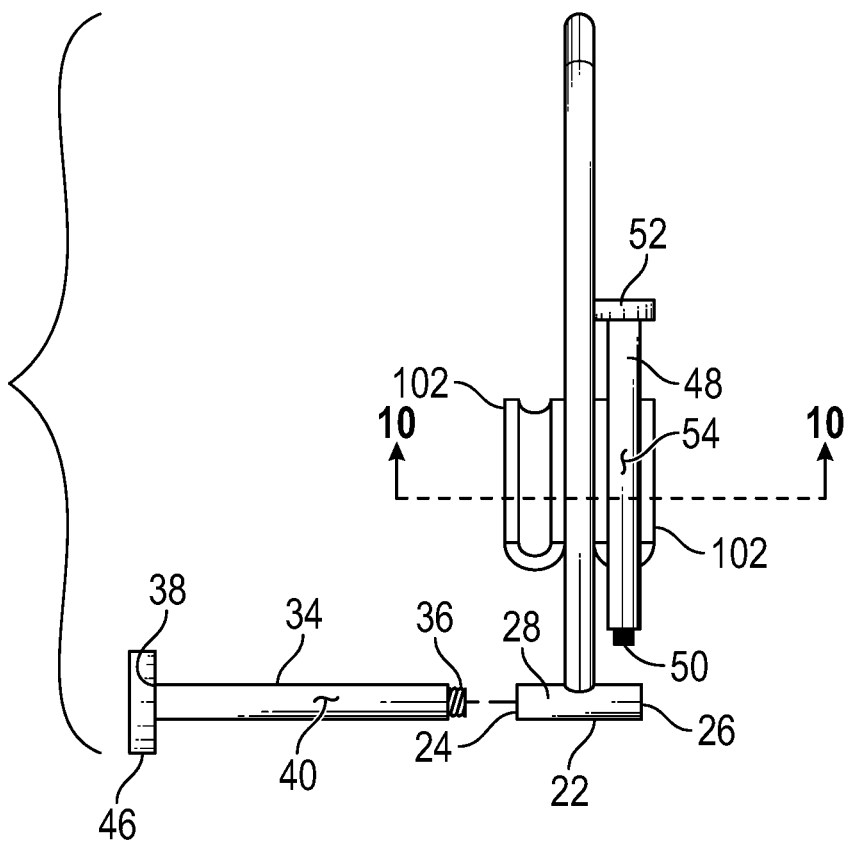
FIG. 9 is an exploded perspective view of an embodiment of the disclosure.
Figure 10:
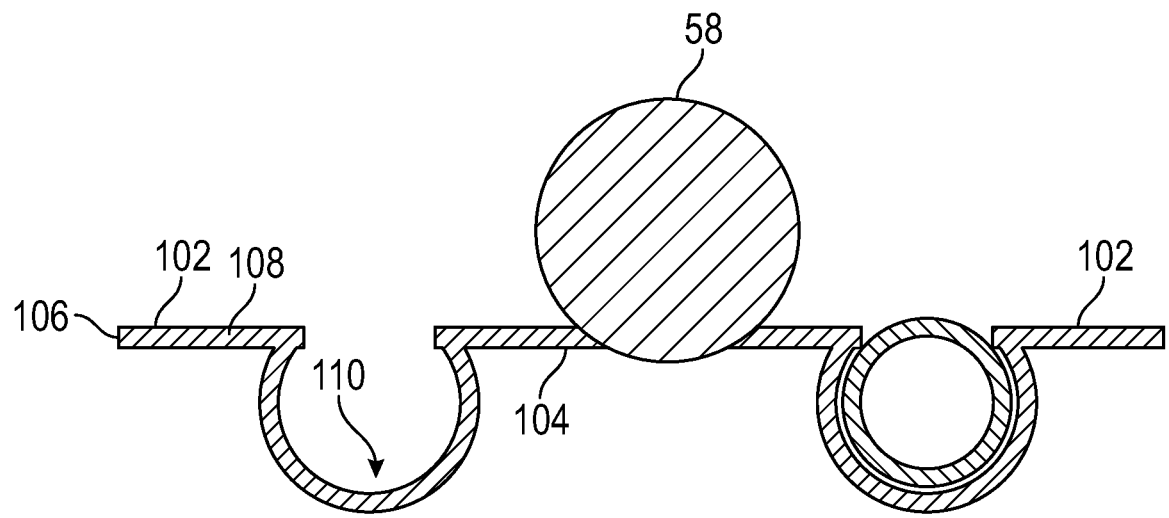
FIG. 10 is a cross sectional view taken along line 10-10 of FIG. 9 of an embodiment of the disclosure.
Figure 11:
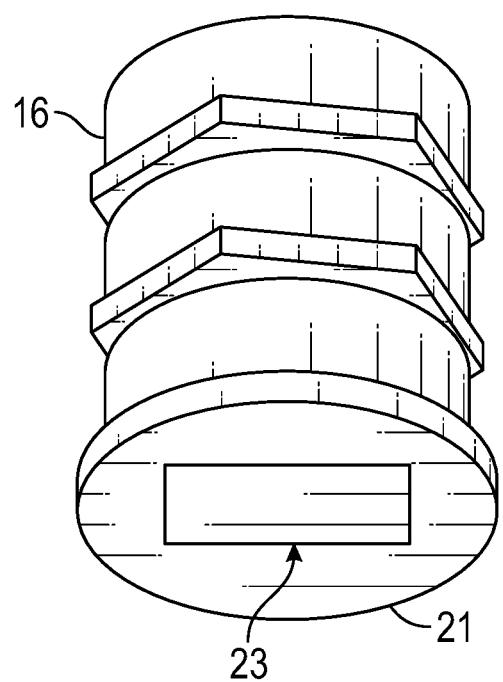
FIG. 11 is a detail view taken from circle 11 of FIG. 7 of an embodiment of the disclosure.

With reference now to the drawings, and in particular to FIGS. 1 through 11 thereof, a new washing device embodying the principles and concepts of an embodiment of the disclosure and generally designated by the reference numeral 10 will be described.

As best illustrated in FIGS. 1 through 11, the power washing assembly 10 generally comprises a spray bar 12 that has a fluid inlet 14 and a plurality of spray nozzles 16. The fluid inlet 14 is fluidly attachable to a fluid source 18 to direct a fluid 20 from the fluid source 18 into the spray bar 12. The fluid source 18 may be a water spigot or the like and the fluid 20 may be water. Each of the spray nozzles 16 is in fluid communication with the fluid inlet 14 such that each of the spray nozzles 16 can spray the fluid 20. Furthermore, the spray bar 12 is modular thereby facilitating the spray bar 12 to be disassembled into a plurality of sections. Each of the spray nozzles 16 may be high pressure spray nozzles that are commonly associated with pressure washers that are capable of increasing pressure of a fluid 20 from approximately 60.0 pounds per square inch to approximately 1000.0 pounds per square inch. Additionally, each of the spray nozzles 16 has a distal end 21 with respect to the spray bar 12 and the distal end 21 of each spray nozzle 16 has an opening 23 extending into the spray nozzles 16 to spray the fluid 20.

The spray bar 12 comprises a fitting 22 that has a first end 24, a second end 26 and an outer wall 28 extending between the first end 24 and the second end 26, and each of the first end 24 and the second end 26 is open and the fitting 22 is hollow. The fluid inlet 14 is coupled to and extends away from the outer wall 28 and the fluid inlet 14 has a distal end 30 with respect to the outer wall 28. Additionally, the outer wall 28 has an inside surface 32 and the inside surface 32 is threaded adjacent to each of the first end 24 and the second end 26.

The spray bar 12 includes a first pipe 34 that has a primary end 36, a secondary end 38 and an outside surface 40 extending between the primary end 36 and the secondary end 38. The primary end 36 is open and the outside surface 40 is threaded adjacent to the primary end 36. Furthermore, the primary end 36 is insertable into the first end 24 of the fitting 22 having the outside surface 40 threadably engaging the inside surface 32 of the fitting 22. Respective ones of the spray nozzles 16 are coupled to the outside surface 40 of the first pipe 34 and the spray nozzles 16 on the first pipe 34 are spaced apart from each other and are distributed between the primary end 36 and the secondary end 38. Furthermore, each of the spray nozzles 16 on the first pipe 34 is directed downwardly on the first pipe 34 when the first pipe 34 is coupled to the fitting 22. A first wheel 46 is rotatably disposed on the secondary end 38 of the first pipe 34 thereby facilitating the first wheel 46 to roll along a support surface 47. The first wheel 46 has a rotational axis which extends along an axis extending through the primary end 36 and the secondary end 38 of the first pipe 34.

The spray bar 12 includes a second pipe 48 that has a primary end 50, a secondary end 52 and an outside surface 54 extending between the primary end 50 and the secondary end 52 of the second pipe 48. The primary end 50 of the second pipe 48 is open and the outside surface 54 of the second pipe 48 is threaded adjacent to the primary end 50 of the second pipe 48. The primary end 50 of the second pipe 48 is insertable into the second end 26 of the fitting 22 having the outside surface 54 of the second pipe 48 threadably engaging the inside surface 32 of the fitting 22. Respective ones of the spray nozzles 16 are coupled to the outside surface 54 of the second pipe 48 and the spray nozzles 16 on the second pipe 48 are spaced apart from each other and are distributed between the primary end 50 and the secondary end 52 of the second pipe 48. Each of the spray nozzles 16 on the second pipe 48 is directed downwardly on the second pipe 48 when the second pipe 48 is coupled to the fitting 22. The spray bar 12 includes a second wheel 56 that is rotatably disposed on the secondary end 38 of the second pipe 48 to roll along the support surface 47. The second wheel 56 has a rotational axis that extends along an axis extending through the primary end 36 and the secondary end 38 of the second pipe 48.

A handle 58 is coupled to the spray bar 12 thereby facilitating the spray bar 12 to be steered along the support surface 47 to clean the support surface 47. The support surface 47 may be a sidewalk, a driveway or other similar resilient, planar surface that would typically be cleaned with a power washer or other source of pressurized water. The handle 58 has an upper end 60, a lower end 62 and an exterior surface 64 extending between the upper end 60 and the lower end 62, and the handle 58 is elongated between the upper end 60 and the lower end 62. The lower end 62 is coupled to the outer wall 28 of the fitting 22 and the handle 58 has a curve 66 that is positioned adjacent to the upper end 60 such that the handle 58 has a J-shape thereby defining a grip 68 between the upper end 60 and the curve 66 for gripping.

A leg 70 is provided and the leg 70 is coupled to and angles downwardly from the handle 58. The leg 70 has a top end 72, a bottom end 74 and an outside wall 76 extending between the top end 72 and the bottom end 74, and the top end 72 is coupled to the exterior surface 64 of the handle 58. The leg 70 has a first portion 78 which slidably engages a second portion 80 such that the leg 70 has a telescopically adjustable length. The top end 72 is associated with the first portion 78 and the bottom end 74 is associated with the second portion 80.

The outside wall 76 associated with the first portion 78 has a plurality of holes 82 extending through the outside wall 76. The holes 82 are spaced apart from each other and are distributed along a substantial length of the first portion 78. Additionally, the outside wall 76 associated with the second portion 80 has an opening 84 extending through the outside wall 76. The second portion 80 has a first section 86 that is rotatably coupled to a second section 88, and a threshold 89 between the first section 86 and the second section 88 is positioned proximate the bottom end 74. A bearing 90 is integrated into the threshold 89 between the first section 86 and the second section 88 thereby facilitating the first section 86 to rotate about a longitudinal axis of the leg 70. The bearing 90 may be a ball bearing or other type of friction reducing bearing 90.

A member 92 is coupled to and extends laterally away from the first section 86 of the second portion 80 of the leg 70 and the member 92 has a distal end 94 with respect to the leg 70. A roller 96 is rotatably coupled to the leg 70 to roll along the support surface 47. A hub 98 of the roller 96 is rotatably disposed on the distal end of the member 92 such that the roller 96 has a rotational axis that is collinear with an axis extending through the leg 70 and the distal end 94 of the member 92. A pin 100 is insertable through the opening 84 in the second portion 80 of the leg 70 and extends through a respective one of the holes 82 in the first portion 78 of the leg 70 for retaining the leg 70 at a desired length.

A pair of holders 102 is provided and each of the holders 102 has a first lateral side 104, a second lateral side 106 and a top surface 108 extending between the first lateral side 104 and the second lateral side 106, and the top surface 108 has a concavely arcuate portion 110. The first lateral side 104 of each of the holders 102 is attached to the exterior surface 64 of the handle 58. Furthermore, each of the holders 102 is positioned on opposing sides of the handle 58 with respect to each other. Each of the first pipe 34 and the second pipe 48 is positionable in the concavely arcuate portion 110 of the top surface 108 of a respective one of the holders 102 for storing the first pipe 34 and the second pipe 48.

A hook 112 is coupled to the handle 58 and the hook 112 curves upwardly from the handle 58 thereby facilitating the hook 112 to hold a fluid hose that is fluidly coupled to the fluid source 18. The hook 112 has a distal end 114 with respect to the exterior surface 64 and the hook 112 curves upwardly between the distal end of the hook 112 and the exterior surface 64. Additionally, the hook 112 is positioned adjacent to the curve 66 in the handle 58.

In use, the fluid hose, or other source of fluid, is fluidly coupled to the fluid inlet 14 and the fluid source 18 is turned on. In this way the fluid 20 is sprayed outwardly through each of the spray nozzles 16 thereby facilitating the spray nozzles 16 to spray the fluid 20 at high pressure to effectively clean the support surface 47. In this way the support surface 47 can be cleaned with water pressure from a typical garden hose rather than requiring a power washer to clean the support surface 47. Furthermore, the spray bar 12 can be disassembled for convenient storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A power washing assembly for washing a horizontal support surface, said assembly comprising:
   a spray bar having a fluid inlet and a plurality of spray nozzles, said fluid inlet being fluidly attachable to a fluid source wherein said fluid inlet is configured to direct a fluid from the fluid source into said spray bar, each of said spray nozzles being in fluid communication with said fluid inlet wherein each of said spray nozzles is configured to spray the fluid, said spray bar being modular thereby facilitating said spray bar to be disassembled into a plurality of sections;
   a handle being coupled to said spray bar thereby facilitating said spray bar to be steered along the horizontal support surface wherein said spray bar is configured to clean the horizontal support surface;
   a leg being coupled to and angling downwardly from said handle;
   a roller being rotatably coupled to said leg wherein said roller is configured to roll along the horizontal support surface;
   a hook being coupled to said handle, said hook curving upwardly from said handle thereby facilitating said hook to hold a fluid hose being fluidly coupled to the fluid source;
   wherein said spray bar comprises a fitting having a first end, a second end and an outer wall extending between said first end and said second end, each of said first end and said second end being open, said fitting being hollow, said fluid inlet being coupled to and extending away from said outer wall, said fluid inlet having a distal end with respect to said outer wall, said outer wall having an inside surface, said inside surface being threaded adjacent to each of said first end and said second end;
   wherein said spray bar includes a first pipe having a primary end, a secondary end and an outside surface extending between said primary end and said secondary end, said primary end being open, said outside surface being threaded adjacent to said primary end, said primary end being insertable into said first end of said fitting having said outside surface threadably engaging said inside surface of said fitting;
   wherein respective ones of said spray nozzles are coupled to said outside surface of said first pipe, said spray nozzles on said first pipe being spaced apart from each other and being distributed between said primary end and said secondary end, each of said spray nozzles having a distal end with respect with respect to said outside surface, said distal end having an opening extending into said spray nozzle wherein said opening is configured to spray the fluid, each of said spray nozzles on said first pipe being directed downwardly on said first pipe when said first pipe is coupled to said fitting;
   wherein said spray bar includes a first wheel being rotatably disposed on said secondary end of said first pipe wherein said first wheel is configured to roll along the horizontal support surface, said first wheel having a rotational axis being extending along an axis extending through said primary end and said secondary end of said first pipe;
   wherein said spray bar includes a second pipe having a primary end, a secondary end and an outside surface extending between said primary end and said secondary end of said second pipe, said primary end of said second pipe being open, said outside surface of said second pipe being threaded adjacent to said primary end of said second pipe, said primary end of said second pipe being insertable into said second end of said fitting having said outside surface of said second pipe threadably engaging said inside surface of said fitting;
   wherein respective ones of said spray nozzles are coupled to said outside surface of said second pipe, said spray nozzles on said second pipe being spaced apart from each other and being distributed between said primary end and said secondary end of said second pipe, each of said spray nozzles having a distal end with respect with respect to said outside surface of said second pipe, said distal end having an opening extending into said spray nozzle wherein said opening is configured to spray the fluid, each of said spray nozzles on said second pipe being directed downwardly on said second pipe when said second pipe is coupled to said fitting;
   wherein said spray bar includes a second wheel being rotatably disposed on said secondary end of said second pipe wherein said second wheel is configured to roll along the horizontal support surface, said second wheel having a rotational axis being extending along an axis extending through said primary end and said secondary end of said second pipe;
   wherein said handle has an upper end, a lower end and an exterior surface extending between said upper end and said lower end, said handle being elongated between said upper end and said lower end, said lower end being coupled to said outer wall of said fitting, said handle having a curve being positioned adjacent to said upper end such that said handle has a J-shape thereby defining a grip between said upper end and said curve for gripping;

wherein said leg has a top end, a bottom end and an outside wall extending between said top end and said bottom end, said top end being coupled to said exterior surface of said handle;

wherein said leg has a first portion slidably engaging a second portion such that said leg has a telescopically adjustable length, said top end being associated with said first portion, said bottom end being associated with said second portion;

wherein said outside wall associated with said first portion having a plurality of holes extending through said outside wall, said holes being spaced apart from each other and being distributed along a length of said first portion;

wherein said outside wall associated with said second portion has an opening extending through said outside wall;

wherein said second portion having a first section being rotatably coupled to a second section; and a pair of holders, each of said holders having a first lateral side, a second lateral side and a top surface extending between said first lateral side and said second lateral side, said top surface having a concavely arcuate portion, said first lateral side of each of said holders being attached to an exterior surface of said handle, each of said first pipe and said second pipe being positionable in said concavely arcuate portion of said top surface of a respective one of said holders for storing said first pipe and said second pipe.

2. The assembly according to claim 1, further comprising a bearing being integrated into said threshold between said first section and said second section thereby facilitating said first section to rotate about a longitudinal axis of said leg.

3. The assembly according to claim 1, further comprising:
a member being coupled to and extending laterally away from said first section of said second portion of said leg, said member having a distal end with respect to said leg; and
a hub of said roller being rotatably disposed on said distal end of said member such that said roller has a rotational axis being collinear with an axis extending through said leg and said distal end of said member.

4. A power washing assembly for washing a horizontal support surface, said assembly comprising:
a spray bar having a fluid inlet and a plurality of spray nozzles, said fluid inlet being fluidly attachable to a fluid source wherein said fluid inlet is configured to direct a fluid from the fluid source into said spray bar, each of said spray nozzles being in fluid communication with said fluid inlet wherein each of said spray nozzles is configured to spray the fluid, said spray bar being modular thereby facilitating said spray bar to be disassembled into a plurality of sections, said spray bar comprising:
a fitting having a first end, a second end and an outer wall extending between said first end and said second end, each of said first end and said second end being open, said fitting being hollow, said fluid inlet being coupled to and extending away from said outer wall, said fluid inlet having a distal end with respect to said outer wall, said outer wall having an inside surface, said inside surface being threaded adjacent to each of said first end and said second end;
a first pipe having a primary end, a secondary end and an outside surface extending between said primary end and said secondary end, said primary end being open, said outside surface being threaded adjacent to said primary end, said primary end being insertable into said first end of said fitting having said outside surface threadably engaging said inside surface of said fitting, respective ones of said spray nozzles being coupled to said outside surface of said first pipe, said spray nozzles on said first pipe being spaced apart from each other and being distributed between said primary end and said secondary end, each of said spray nozzles having a distal end with respect with respect to said outside surface, said distal end having an opening extending into said spray nozzle wherein said opening is configured to spray the fluid, each of said spray nozzles on said first pipe being directed downwardly on said first pipe when said first pipe is coupled to said fitting;
a first wheel being rotatably disposed on said secondary end of said first pipe wherein said first wheel is configured to roll along the horizontal support surface, said first wheel having a rotational axis being extending along an axis extending through said primary end and said secondary end of said first pipe;
a second pipe having a primary end, a secondary end and an outside surface extending between said primary end and said secondary end of said second pipe, said primary end of said second pipe being open, said outside surface of said second pipe being threaded adjacent to said primary end of said second pipe, said primary end of said second pipe being insertable into said second end of said fitting having said outside surface of said second pipe threadably engaging said inside surface of said fitting, respective ones of said spray nozzles being coupled to said outside surface of said second pipe, said spray nozzles on said second pipe being spaced apart from each other and being distributed between said primary end and said secondary end of said second pipe, each of said spray nozzles having a distal end with respect with respect to said outside surface of said second pipe, said distal end having an opening extending into said spray nozzle wherein said opening is configured to spray the fluid, each of said spray nozzles on said second pipe being directed downwardly on said second pipe when said second pipe is coupled to said fitting; and
a second wheel being rotatably disposed on said secondary end of said second pipe wherein said second wheel is configured to roll along the horizontal support surface, said second wheel having a rotational axis being extending along an axis extending through said primary end and said secondary end of said second pipe;
a handle being coupled to said spray bar thereby facilitating said spray bar to be steered along the horizontal support surface wherein said spray bar is configured to clean the horizontal support surface, said handle having an upper end, a lower end and an exterior surface extending between said upper end and said lower end, said handle being elongated between said upper end and said lower end, said lower end being coupled to said outer wall of said fitting, said handle having a curve being positioned adjacent to said upper end such that said handle has a J-shape thereby defining a grip between said upper end and said curve for gripping;

a leg being coupled to and angling downwardly from said handle, said leg having a top end, a bottom end and an outside wall extending between said top end and said bottom end, said top end being coupled to said exterior surface of said handle, said leg having a first portion slidably engaging a second portion such that said leg has a telescopically adjustable length, said top end being associated with said first portion, said bottom end being associated with said second portion, said outside wall associated with said first portion having a plurality of holes extending through said outside wall, said holes being spaced apart from each other and being distributed along a length of said first portion, said outside wall associated with said second portion having an opening extending through said outside wall, said second portion having a first section being rotatably coupled to a second section;

a bearing being integrated into said threshold between said first section and said second section thereby facilitating said first section to rotate about a longitudinal axis of said leg;

a member being coupled to and extending laterally away from said first section of said second portion of said leg, said member having a distal end with respect to said leg;

a roller being rotatably coupled to said leg wherein said roller is configured to roll along the horizontal support surface, a hub of said roller being rotatably disposed on said distal end of said member such that said roller has a rotational axis being collinear with an axis extending through said leg and said distal end of said member;

a pin being insertable through said opening in said second portion of said leg and extending through a respective one of said holes in said first portion of said leg for retaining said leg at a desired length;

a pair of holders, each of said holders having a first lateral side, a second lateral side and a top surface extending between said first lateral side and said second lateral side, said top surface having a concavely arcuate portion, said first lateral side of each of said holders being attached to said exterior surface of said handle, each of said first pipe and said second pipe being positionable in said concavely arcuate portion of said top surface of a respective one of said holders for storing said first pipe and said second pipe; and a hook being coupled to said handle, said hook curving upwardly from said handle thereby facilitating said hook to hold a fluid hose being fluidly coupled to the fluid source, said hook having a distal end with respect to said exterior surface, said hook curving upwardly between said distal end of said hook and said exterior surface, said hook being positioned adjacent to said curve in said handle.

\* \* \* \* \*